(12) United States Patent
Oh et al.

(10) Patent No.: US 11,034,135 B2
(45) Date of Patent: *Jun. 15, 2021

(54) LAMINATED GLASS AND METHOD FOR MANUFACTURING THE SAME

(71) Applicant: LG CHEM, LTD., Seoul (KR)

(72) Inventors: Jun Hak Oh, Daejeon (KR); Jae Hyuk Yoon, Daejeon (KR); Chang Hee Lee, Daejeon (KR); Ho Seong Kang, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/348,394

(22) PCT Filed: Feb. 27, 2018

(86) PCT No.: PCT/KR2018/002356
§ 371 (c)(1),
(2) Date: May 8, 2019

(87) PCT Pub. No.: WO2018/155990
PCT Pub. Date: Aug. 30, 2018

(65) Prior Publication Data
US 2019/0366684 A1    Dec. 5, 2019

(30) Foreign Application Priority Data
Feb. 27, 2017 (KR) .................. 10-2017-0025672

(51) Int. Cl.
*B32B 17/10* (2006.01)
*B32B 7/022* (2019.01)
(Continued)

(52) U.S. Cl.
CPC ........ *B32B 17/10119* (2013.01); *B32B 7/022* (2019.01); *B32B 7/12* (2013.01);
(Continued)

(58) Field of Classification Search
CPC .................. B60J 1/00; B60J 1/001; B32B 17/10036–10128; B32B 17/10807–1099; C03C 21/00–002; Y10T 428/315
See application file for complete search history.

(56) References Cited

U.S. PATENT DOCUMENTS 5,928,793 A * 7/1999 Kimura ................. C03C 21/002
428/428
6,268,304 B1 * 7/2001 Maeda .................... C03C 3/091
501/63
(Continued)

FOREIGN PATENT DOCUMENTS

EP    3450161 A1    3/2019
EP    3524427 A1    8/2019
(Continued)

OTHER PUBLICATIONS

Machine translation of JP 2015/205784 A, obtained from J-Platpat service of the JPO (Year: 2020).*

*Primary Examiner* — Z. Jim Yang
(74) *Attorney, Agent, or Firm* — Dentons US LLP

(57) ABSTRACT

The present disclosure relates to a laminated glass and a method of manufacturing the laminated glass. The laminated glass includes a soda-lime glass and a thin plate glass laminated on one surface of the soda-lime glass, and has excellent durability and light weight.

12 Claims, 3 Drawing Sheets

(51) Int. Cl.
  *B32B 7/12* (2006.01)
  *B32B 27/30* (2006.01)
  *B32B 37/12* (2006.01)
  *B32B 37/18* (2006.01)
  *C03B 23/023* (2006.01)
  *C03C 27/10* (2006.01)
  *C03C 3/085* (2006.01)

(52) U.S. Cl.
  CPC .. *B32B 17/10036* (2013.01); *B32B 17/10761* (2013.01); *B32B 17/10935* (2013.01); *B32B 27/30* (2013.01); *B32B 37/12* (2013.01); *B32B 37/182* (2013.01); *C03B 23/023* (2013.01); *C03C 3/085* (2013.01); *C03C 27/10* (2013.01); *B32B 2307/558* (2013.01); *B32B 2315/08* (2013.01); *B32B 2329/06* (2013.01); *B32B 2605/006* (2013.01); *B32B 2605/08* (2013.01)

(56) References Cited

U.S. PATENT DOCUMENTS

| | | | |
|---|---|---|---|
| 2008/0110208 A1* | 5/2008 | Ellison | C03C 3/091 65/90 |
| 2008/0292856 A1* | 11/2008 | Garner | H01L 51/0097 428/220 |
| 2009/0223092 A1 | 9/2009 | Harber et al. | |
| 2011/0097572 A1 | 4/2011 | Yonekura et al. | |
| 2011/0312483 A1* | 12/2011 | Nakashima | C03C 3/083 501/70 |
| 2014/0014260 A1* | 1/2014 | Chowdhury | B32B 17/061 156/222 |
| 2014/0141206 A1* | 5/2014 | Gillard | B32B 17/10036 428/174 |
| 2014/0171286 A1* | 6/2014 | Lee | C03C 3/091 501/66 |
| 2014/0235425 A1* | 8/2014 | Nishizawa | C03C 3/087 501/67 |
| 2015/0132538 A1 | 5/2015 | Cleary et al. | |
| 2015/0158275 A1 | 6/2015 | D'Errico et al. | |
| 2015/0232371 A1 | 8/2015 | Murashige et al. | |
| 2015/0329408 A1* | 11/2015 | Bookbinder | C03C 3/045 428/410 |
| 2016/0136929 A1* | 5/2016 | Meiss | B32B 17/10018 428/213 |
| 2016/0225396 A1 | 8/2016 | Shimojima | |
| 2017/0008377 A1* | 1/2017 | Fisher | B32B 17/10036 |
| 2017/0057205 A1* | 3/2017 | Notsu | B32B 17/10036 |
| 2017/0096364 A1* | 4/2017 | Ottermann | C03C 3/085 |
| 2017/0329192 A1* | 11/2017 | Ono | G02F 1/136286 |
| 2018/0141850 A1* | 5/2018 | Dejneka | C03C 3/085 |
| 2018/0215125 A1* | 8/2018 | Gahagan | G02F 1/136286 |

FOREIGN PATENT DOCUMENTS

| | | | | |
|---|---|---|---|---|
| EP | 3560899 A1 | 10/2019 | | |
| JP | 4225086 B2 | 2/2009 | | |
| JP | 201013311 A | 1/2010 | | |
| JP | 2013247253 A | 12/2013 | | |
| JP | 201497923 A | 5/2014 | | |
| JP | 2015205784 A | * 11/2015 | ....... | B32B 17/10036 |
| JP | 2015205784 A | 11/2015 | | |
| JP | 2016530190 A | 9/2016 | | |
| KR | 1020140088704 A | 7/2014 | | |
| KR | 1020150020631 A | 2/2015 | | |
| KR | 1020160095143 A | 8/2016 | | |
| WO | 2016/196531 A1 | 12/2016 | | |
| WO | WO-2016196531 A1 | * 12/2016 | ....... | B32B 17/10761 |

\* cited by examiner

[Figure 1]
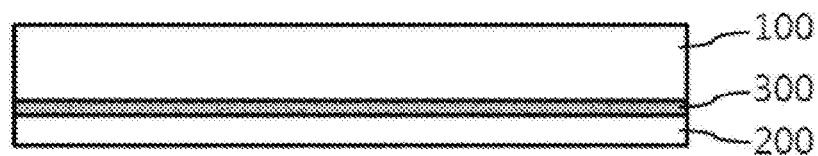
[Figure 2]
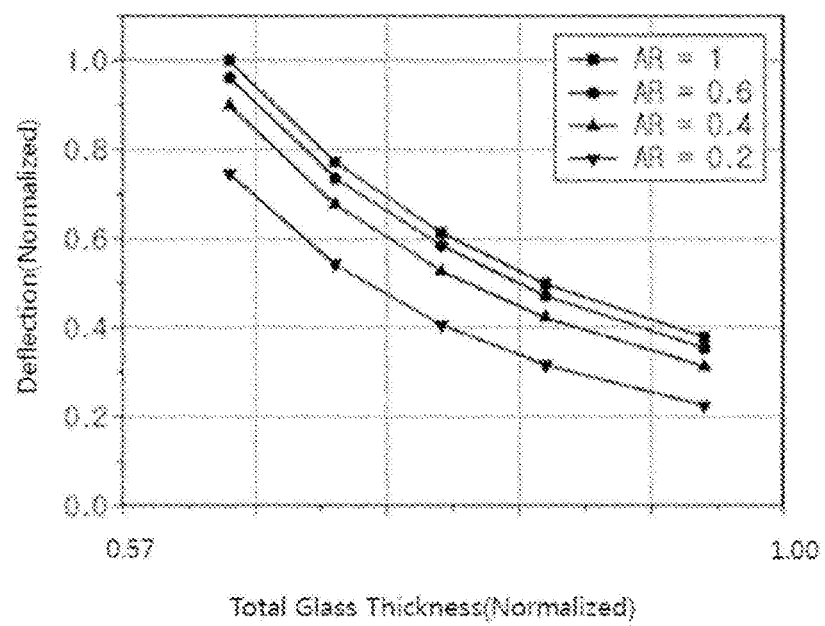

[Figure 3]
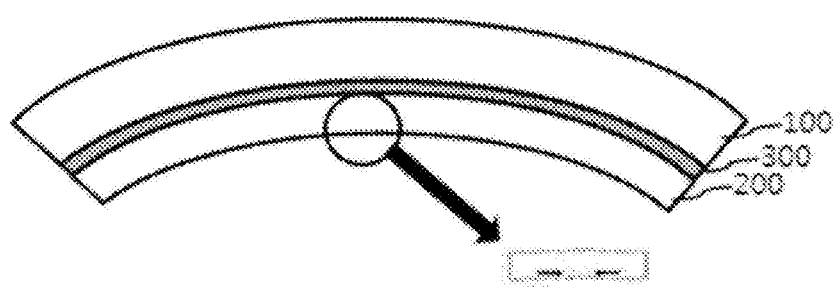
[Figure 4A]
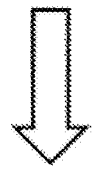
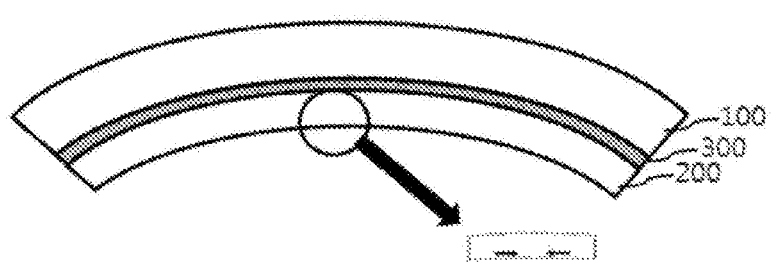

[Figure 4B]
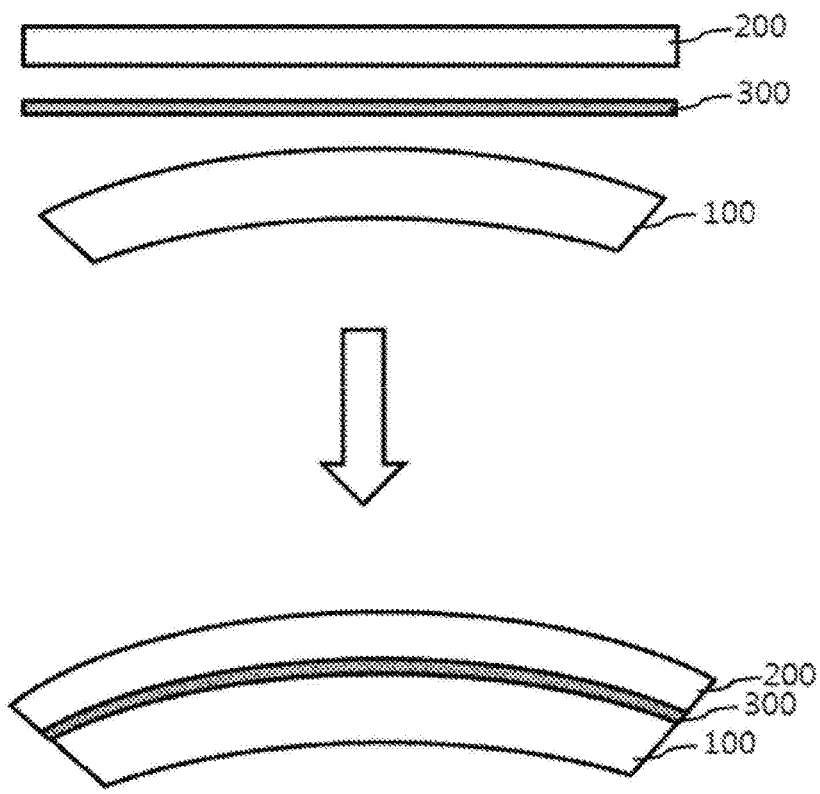

LAMINATED GLASS AND METHOD FOR MANUFACTURING THE SAME

CROSS-REFERENCE TO RELATED APPLICATION

This application is the national stage of international Application No. PCT/KR2018/002356 filed Feb. 27, 2018, which claims priority to and the benefit of Korean Patent Application No. 10-2017-0025672 filed in the Korean Intellectual Property Office on Feb. 27, 2017, the entire contents of which are incorporated herein by reference.

TECHNICAL FIELD

The present disclosure relates to laminated glass and a method for manufacturing laminated glass, and more particularly, to laminated glass which is excellent in durability and lightweight, and a method for manufacturing the same.

BACKGROUND ART

For use as a car window of an automobile, laminated glass in a form in which two sheets of glass are laminated by a laminating film has been widely distributed. In many cases, two sheets of glass in laminated glass have the same composition and the same thickness for the purpose of reducing manufacturing costs.

Recently, a weight reduction technology capable of improving fuel economy and performance of automobiles has received great interest in the automotive field as interests in environmentally friendly automobiles have emerged. In particular, in order to achieve a weight reduction for laminated glass used in automobiles, a method for manufacturing laminated glass by laminating thin glass was proposed. However, when laminated glass is manufactured by laminating thin glass, the stiffness of the laminated glass is reduced as the total thickness of the laminated glass is decreased. When the stiffness of the laminated glass deteriorates, the amount of deformation in the laminated glass occurring due to a predetermined load is increased, so that the tensile stress applied to the surface of the laminated glass is increased. This means that when the external impact and the concentrated load are applied to the laminated glass as the thickness of the laminated glass becomes small, the probability of fracture of the laminated glass is increased. Accordingly, when the glass used for the laminated glass is merely manufactured to have a small thickness and laminated, there may occur a problem in that the fracture strength of the laminated glass is lowered.

When laminated glass is manufactured by using glass which has been thermally or chemically tempered in order to prevent the fracture strength of the laminated glass from being lowered, glass may be shattered due to internal tensile stress when the laminated glass is fractured, so that a problem in that the visual field of a driver is obstructed may occur. Further, when a process of thermally or chemically tempering glass used for the laminated glass is performed, there may occur a problem in that the manufacturing costs of the laminated glass are increased.

Therefore, there is a need for a technology capable of achieving a reduction in weight of laminated glass and preventing the fracture strength of the laminated glass from being lowered.

DETAILED DESCRIPTION OF THE INVENTION

Technical Problem

Thus, the present disclosure has been made in an effort to provide laminated glass which is excellent in durability and lightweight, and a method for manufacturing the same.

However, a problem to be solved by the present disclosure is not limited to the aforementioned problem, and the other problems that are not mentioned may be clearly understood by a person skilled in the art from the following description.

Technical Solution

An exemplary embodiment of the present invention provides laminated glass including: soda-lime glass; and thin plate glass laminated on one surface of the soda-lime glass, in which fracture toughness of the thin plate glass, which is represented by the following Equation 1, is 1.0 MPa·m$^{1/2}$ or more and 1.3 MPa·m$^{1/2}$ or less.

$$K_{IC} = 0.018\left(\frac{E}{HV}\right)^{1/2}\left(\frac{P}{C^{3/2}}\right) \qquad \text{[Equation 1]}$$

In Equation 1, $K_{IC}$ is fracture toughness (Pa·m$^{1/2}$) of the thin plate glass, E is a Young's modulus (Pa) of the thin plate glass, HV is Vicker's hardness (Pa) of the thin plate glass, P is an indentation load (N) applied to the thin plate glass, and C is a length (m) of a crack occurring in the thin plate glass due to the indentation load applied to the thin plate glass.

Another exemplary embodiment of the present invention provides a method for manufacturing laminated glass, the method including: preparing plate-like soda-lime glass; preparing thin plate glass; and laminating the thin plate glass on one surface of the soda-lime glass, in which fracture toughness of the thin plate glass, which is represented by the following Equation 1, is 1.0 MPa·m$^{1/2}$ or more and 1.3 MPa·m$^{1/2}$ or less.

$$K_{IC} = 0.018\left(\frac{E}{HV}\right)^{1/2}\left(\frac{P}{C^{3/2}}\right) \qquad \text{[Equation 1]}$$

In Equation 1, $K_{IC}$ is fracture toughness (Pa·m$^{1/2}$) of the thin plate glass, E is a Young's modulus (Pa) of the thin plate glass, HV is Vicker's hardness (Pa) of the thin plate glass, P is an indentation load (N) applied to the thin plate glass, and C is a length (m) of a crack occurring in the thin plate glass due to the indentation load applied to the thin plate glass.

Advantageous Effects

According to an exemplary embodiment of the present invention, it is possible to provide laminated glass which is excellent in durability and lightweight.

A method for manufacturing laminated glass according to an exemplary embodiment of the present invention may easily provide laminated glass which is excellent in durability and lightweight.

The effects of the present invention are not limited to the above-described effects, and effects, which are not mentioned, will be clearly understood by a person skilled in the art from the specification of the present application and the accompanying drawings.

BRIEF DESCRIPTION OF DRAWINGS

FIG. 1 is a view illustrating laminated glass according to an exemplary embodiment of the present invention.

FIG. 2 is a view illustrating a stiffness of laminated glass according to a thickness ratio of soda-lime glass to thin plate glass according to an exemplary embodiment of the present invention.

FIG. 3 is a view illustrating curved laminated glass according to an exemplary embodiment of the present invention.

FIG. 4A is a view illustrating a process of laminating one surface of thin plate glass according to an exemplary embodiment of the present invention on one concave surface of soda-lime glass processed into a curved surface, and FIG. 4B is a view illustrating a process of laminating one surface of thin plate glass according to an exemplary embodiment of the present invention on one convex surface of soda-lime glass processed into a curved surface.

BEST MODE

Throughout the specification of the present application, when one part "includes" one constituent element, unless otherwise specifically described, this does not mean that another constituent element is excluded, but means that another constituent element may be further included.

Throughout the specification of the present application, when one member is disposed "on" another member, this includes not only a case where the one member is brought into contact with another member, but also a case where still another member is present between the two members.

Throughout the specification of the present application, the unit "wt %" may mean a weight ratio of a component included in a member based on the total weight of the member.

Throughout the specification of the present application, "radius of curvature" may mean a minimum value of a radius of an arc which is closest to a curved surface in all the directions from one point on a surface of a member processed into the curved surface, and the radius of curvature may be measured by scanning and modeling a surface of a member processed into a curved surface using a 3D scanner (Faro/Focus S), and the like.

Hereinafter, the present specification will be described in more detail.

FIG. 1 is a view illustrating laminated glass according to an exemplary embodiment of the present invention. Specifically, FIG. 1 is a view illustrating laminated glass in which a laminating film 300 is interposed between soda-lime glass 100 and thin plate glass 200, and as a result, the soda-lime glass 100 and the thin plate glass 200 are laminated.

An exemplary embodiment of the present invention provides laminated glass including: soda-lime glass; and thin plate glass laminated on one surface of the soda-lime glass, in which fracture toughness of the thin plate glass, which is represented by the following Equation 1, is 1.0 MPa·m$^{1/2}$ or more and 1.3 MPa·m$^{1/2}$ or less.

$$K_{IC} = 0.018 \left(\frac{E}{HV}\right)^{1/2} \left(\frac{P}{C^{3/2}}\right)$$ [Equation 1]

In Equation 1, $K_{IC}$ is fracture toughness (Pa·m$^{1/2}$) of the thin plate glass, E is a Young's modulus (Pa) of the thin plate glass, HV is Vicker's hardness (Pa) of the thin plate glass, P is an indentation load (N) applied to the thin plate glass, and C is a length (m) of a crack occurring in the thin plate glass due to the indentation load applied to the thin plate glass.

According to an exemplary embodiment of the present invention, it is possible to provide laminated glass which is excellent in durability and lightweight. Specifically, the laminated glass including the thin plate glass having the fracture toughness satisfying Equation 1 may be excellent in durability. Further, since the thin plate glass has a smaller thickness than that of the soda-lime glass, the laminated glass may be effectively lightweight.

According to an exemplary embodiment of the present invention, the facture toughness value of the thin plate glass, which is represented by Equation 1, may be 1.0 MPa·m$^{1/2}$ or more and 1.3 MPa·m$^{1/2}$ or less. Specifically, the fracture toughness value of the thin plate glass may be 1.15 MPa·m$^{1/2}$ or more 1.25 MPa·m$^{1/2}$ or less, or 1.18 MPa·m$^{1/2}$ or more and 1.21 MPa·m$^{1/2}$ or less. When the fracture toughness value of the thin plate glass is within the above range, it is possible to suppress the impact resistance of the laminated glass from deteriorating and to effectively improve the manufacturing efficiency of the laminated glass by preventing the productivity of an original sheet of the thin plate glass from being reduced.

According to an exemplary embodiment of the present invention, the fracture toughness value of the soda-lime glass, which is represented by Equation 1, may be 0.7 MPa·m$^{1/2}$ or more and 0.9 MPa·m$^{1/2}$ or less. Specifically, the fracture toughness value of the soda-lime glass may be 0.75 MPa·m$^{1/2}$ or more and 0.80 MPa·m$^{1/2}$ or less, or 0.83 MPa·m$^{1/2}$ or more and 0.88 MPa·m$^{1/2}$ or less.

According to an exemplary embodiment of the present invention, the fracture toughness values of the thin plate glass and the soda-lime glass may be measured by using an indentation fracture toughness measurement method, which is a method of calculating the fracture toughness value by pressing down the glass with a Vicker's indenter until a crack occurs occur in the glass, and then using a length of the crack, an indenter mark, a load, and the like. Specifically, the fracture toughness values of the thin plate glass and the soda-lime glass may be measured by setting an indentation load to 19.6 N (2 Kgf) in accordance with the KS L 1600:2010 standard under the conditions of a temperature at 24° C. and humidity at 35RH %, and then using Equation 1.

According to an exemplary embodiment of the present invention, a fracture toughness ratio of the soda-lime glass to the thin plate glass may be 1:1.3 to 1:1.5. Specifically, the fracture toughness ratio of the soda-lime glass to the thin plate glass, which is calculated by Equation 1, may be 1:1.35 to 1:1.45, or 1:1.38 to 1:1.41. When the fracture toughness ratio of the soda-lime glass to the thin plate glass is within the above range, critical tensile stress of the laminated glass may be effectively improved, thereby providing lightweight laminated glass having excellent impact resistance.

The critical tensile stress, which is a tensile stress applied to the laminated glass when the laminated glass is fractured, may satisfy a relationship of the following Equation 2 by assuming a case where specific tensile stress is applied to fine cracks present on the surface of the laminated glass, so that the laminated glass is fractured.

$$\sigma_c \propto \frac{K_{IC}}{\sqrt{a}}$$ [Equation 2]

In Equation 2, $\sigma_c$ is the critical tensile stress of glass, $K_{IC}$ is the fracture toughness of the glass, and a is the length of a crack causing a fracture of the glass.

According to an exemplary embodiment of the present invention, the laminated glass, which includes the thin plate glass having a fracture toughness value within the above-described range, and has the fracture toughness ratio of the soda-lime glass to the thin plate glass satisfying the above-described range, has an advantage in that the probability of fracture is remarkably lowered against the same impact as compared to general laminated glass.

According to an exemplary embodiment of the present invention, the thin plate glass may have a Young's modulus of 70 GPa or more and 90 GPa or less, and the thin plate glass may have Vicker's hardness of 5.5 GPa or more and 7 GPa or less. Specifically, the thin plate glass may have a Young's modulus of 73 GPa or more and 87 GPa or less, 75 GPa or more and 85 GPa or less, 78 GPa or more and 80 GPa or less, 75 GPa or more and 80 GPa or less, or 80 GPa or more and 90 GPa or less. Laminated glass including the thin plate glass having a Young's modulus within the above-described range may have a robust structure. In addition, the soda-lime glass may have a Young's modulus of 60 GPa or more and 75 GPa or less.

The Young's moduli of the thin plate glass and the soda-lime glass may be measured by a 3 point bending test. Specifically, the Young's moduli of the thin plate glass and the soda-lime glass may be measured by a 3 point bending test using a universal test machine (UTM) in an atmosphere of 24° C. and 35 RH %. More specifically, the Young's modulus may be derived by setting a width and a support span of a sample to 20 mm and 50 mm, respectively, deriving a strain-stress (S-S) curve by converting a displacement and a load measured by the universal test machine into a strain value and a stress value, and then using a slope calculated by linear fitting of the S-S curve.

According to an exemplary embodiment of the present invention, the thin plate glass may have Vicker's hardness of 5.5 GPa or more and 7 GPa or less. Specifically, the thin plate glass may have Vicker's hardness of 5.8 GPa or more and 6.9 GPa or less, 6.0 GPa or more and 6.7 GPa or less, 6.2 GPa or more and 6.5 GPa or less, or 5.5 GPa or more and 6.5 GPa or less. Laminated glass including the thin plate glass having a Vicker's hardness value within the above-described range may be excellent in impact resistance, wear resistance, durability, and the like. Further, the manufacturing costs of an original sheet of thin plate glass may be reduced by using thin plate glass having Vicker's hardness within the above-described range, thereby reducing the manufacturing costs of the laminated glass. In addition, the soda-lime glass may have Vicker's hardness of 5.0 GPa or more and 6.0 GPa or less.

The Vicker's hardness of the thin plate glass and the soda-lime glass may be calculated by a Vicker's hardness measurement test of pressing down glass using a Vicker's indenter, and then measuring a size of a mark. Specifically, the Vicker's hardness of each of the thin plate glass and the soda-lime glass may be measured by setting an indentation load and an indentation maintaining time to 200 gf and 20 seconds, respectively, in accordance with the ASTM C1327-08 standard under the conditions of a temperature at 24° C. and humidity at 35RH % to perform an indentation test, and then dividing the indentation load by an impression projection area.

According to an exemplary embodiment of the present invention, a Young's modulus ratio of the soda-lime glass to the thin plate glass may be 1:1.01 to 1:1.2. Specifically, the Young's modulus ratio of the soda-lime glass to the thin plate glass may be 1:1.04 to 1:1.17, 1:1.06 to 1:1.15, 1:1.08 to 1:1.12, or 1:1.08 to 1:1.15. Since the thin plate glass has a Young's modulus within the above-described range as compared to that of the soda-lime glass, the laminated glass may have a robust structure even when the laminated glass includes thin plate glass which is thinner than the soda-lime glass.

According to an exemplary embodiment of the present invention, a Vicker's hardness ratio of the soda-lime glass to the thin plate glass may be 1:1.1 to 1:1.3. Specifically, the Vicker's hardness ratio of the soda-lime glass to the thin plate glass may be 1:1.12 to 1:1.29, 1:1.15 to 1:1.27, or 1:1.2 to 1:1.25. Laminated glass including the thin plate glass having higher hardness than that of the soda-lime glass may have excellent durability.

According to an exemplary embodiment of the present invention, as the soda-lime glass, glass composed of components and contents typically used as window glass of transportation means in the art may be adopted and used without particular limitation, as long as the glass satisfies the fracture toughness, the Young's modulus, the Vicker's hardness, and the like described above. As the soda-lime glass, it is possible to use, for example, glass which is formed from a composition including 65 wt % or more and 75 wt % or less of $SiO_2$, 0 wt % or more and 10 wt % or less of $Al_2O_3$, 10 wt % or more and 15 wt % or less of $NaO_2$, 0 wt % or more and 5 wt % or less of $K_2O$, 1 wt % or more and 12 wt % or less of CaO, and 0 wt % or more and 8 wt % or less of MgO, based on 100 wt % of the composition. Further, as the soda-lime glass, it is possible to use glass manufactured by a float method using a float bath, or glass manufactured by a down draw method or a fusion method.

According to an exemplary embodiment of the present invention, it is possible to adopt and use, as the thin plate glass, glass, which is typically used as window glass of a transportation means, without particular limitation, as long as the glass satisfies the fracture toughness, the Vicker's hardness, and the Young's modulus described above. For example, it is possible to use, as the thin plate glass, alkali-free glass which is formed from a composition which includes 46 wt % or more and 62 wt % or less of $SiO_2$, 15 wt % or more and 29 wt % or less of $Al_2O_3$, 3 wt % or more and 14 wt % or less of MgO, 5 wt % or more and 16 wt % or less of CaO, and 0.01 wt % or more and 5 wt % or less of SrO, based on 100 wt % of the composition, and substantially contains no alkali metal oxide.

The composition which substantially contains no alkali metal oxide may mean a case where an alkali metal oxide is not included in glass at all, or a case where the alkali metal oxide is a little included, but the content thereof is extremely slight as compared to the other components, so that an amount of alkali metal oxide, which is negligible as a composition component of glass, is included, and the like. For example, the term "substantially contains no alkali metal oxide" may mean a case where in a process of manufacturing glass, a trace of alkali metal element inevitably incorporated into glass from refractory materials, which are brought into contact with melt glass, impurities in a glass raw material, and the like is contained.

According to an exemplary embodiment of the present invention, as the alkali-free glass which may be used as the thin plate glass, it is possible to use alkali-free glass containing less than 1% of alkali metal (Li, Na, K, and the like) oxide as represented by mass percentage in terms of oxides. Further, as the thin plate glass, it is possible to use alkali-free borosilicate glass or alkali-free aluminoborosilicate glass. In addition, as the thin plate glass, it is possible to use glass manufactured by a float method, or glass manufactured by a down draw method or a fusion method.

Further, since alkali-free glass which may be used as the thin plate glass does not include alkali components which weaken the bonding strength of glass, or includes an extremely small amount of alkali components, the alkali-free glass has the wear resistance of the surface and the impact resistance, which are higher than those of general glass, thereby effectively reducing the weight of lamination glass, and improving the wear resistance and durability of the laminated glass.

According to an exemplary embodiment of the present invention, the thin plate glass may be non-tempered glass. Specifically, the thin plate glass may be non-tempered glass which is not chemically tempered, non-tempered glass which is not tempered by heat, or non-tempered glass which is not tempered by using chemicals and heat.

Generally tempered glass is glass of which the strength is increased and to which impact resistance, fracture resistance, and the like are imparted, and examples thereof include heat-tempered glass by physical heat and chemically tempered glass by a chemical ion exchange. When laminated glass is manufactured by using the aforementioned tempered glass, the process of processing and molding the tempered glass is not easy, so that there are problems in that a defect rate of the laminated glass is high and costs of manufacturing the laminated glass are high. Further, when glass is subjected to an ion tempering process at high temperature for a predetermined time, which requires a cleaning process, there are problems in that the time for manufacturing laminated glass is increased and the production costs thereof are increased.

In contrast, according to an exemplary embodiment of the present invention, since non-tempered glass may be used as the thin plate glass, the glass is easily processed and the manufacturing costs thereof may be decreased by omitting the tempering process, so that it is possible to solve problems which may occur during the process of manufacturing laminated glass by using tempered glass in the related art, and to reduce the manufacturing costs and manufacturing time thereof. In addition, when non-tempered alkali-free glass is used as the thin plate glass, it is possible to manufacture laminated glass which is strong against a local impact and reduces obstruction of a visual field of a user or secondary damage caused by shattered glass even when the laminated glass is fractured.

According to an exemplary embodiment of the present invention, a thickness ratio of the soda-lime glass to the thin plate glass may be 1:0.1 to 1:0.5. Specifically, the thickness ratio of the soda-lime glass to the thin plate glass may be 1:0.15 to 1:0.45, 1:0.2 to 1:0.4, or 1:0.25 to 1:0.3. By adjusting the thickness ratio of the soda-lime glass to the thin plate glass to the above-described range, it is possible to effectively prevent an increase in probability of fracture caused by a drop in stiffness of laminated glass. Furthermore, it is possible to effectively reduce a weight and a thickness of laminated glass to be manufactured.

FIG. 2 is a view illustrating stiffness of laminated glass according to a thickness ratio of soda-lime glass to thin plate glass according to an exemplary embodiment of the present invention. Specifically, FIG. 2 is a view illustrating that an amount of drooping at the center of the laminated glass according to an exemplary embodiment of the present invention is analyzed by applying a predetermined load to the center of the laminated glass in a state where four corners of the laminated glass are fixed.

More specifically, FIG. 2 is a view illustrating an analysis of an amount of drooping of laminated glass according to the application of a load of 100 N to the center of the laminated glass with respect to a laminated glass sample cut into a width of 30 cm and a length of 30 cm.

Further, in FIG. 2, the x-axis means the normalized total thickness of laminated glass, and the y-axis means the normalized amount of drooping of laminated glass, that is, the degree to which the laminated glass is bent.

According to an exemplary embodiment of the present invention, an asymmetry ratio (AR), which is [a thickness of thin plate glass]/[a thickness of soda-lime glass], may satisfy a range of 0.1 to 0.5. As the AR becomes small, the thickness of the thin plate glass becomes small, and the thickness of the soda-lime glass becomes large. Referring to FIG. 2, the stiffness of the laminated glass may be increased by adjusting the thickness ratio of the thin plate glass to the soda-lime glass to the above-described range.

Accordingly, according to an exemplary embodiment of the present invention, it is possible to more improve a stiffness increasing effect, a weight reducing effect, and a thickness reducing effect for the laminated glass by adjusting the thickness ratio of the thin plate glass to the soda-lime glass to the above-described range.

According to an exemplary embodiment of the present invention, the thin plate glass may have a thickness of 0.3 mm or more and 1.0 mm or less. Specifically, the thin plate glass may have a thickness of 0.3 mm or more and 0.8 mm or less, 0.4 mm or more and 0.6 mm or less, 0.3 mm or more and 0.7 mm or less, or 0.5 mm or more and 0.8 mm or less. Laminated glass including the thin plate glass having a thickness within the above-described range has excellent impact resistance, and simultaneously, may become effectively lightweight and thin. Further, thin plate glass having a thickness within the above-described range may be easily elastically deformed as described below.

According to an exemplary embodiment of the present invention, the soda-lime glass may have a thickness of 1.4 mm or more and 3.0 mm or less. Specifically, the soda-lime glass may have a thickness of 2.0 mm or more and 2.5 mm or less. By adjusting the thickness of the soda-lime glass to the above-described range, it is possible to prevent the impact resistance of the laminated glass from deteriorating, and to effectively achieve a reduction in weight and thickness of the laminated glass.

Furthermore, the upper limit values and lower limit values of thicknesses of the thin plate glass and the soda-lime glass may be determined by considering that an external strength and a mechanical impact strength applied to the laminated glass are elastically absorbed, and the like.

According to an exemplary embodiment of the present invention, laminated glass, which includes the thin plate glass and the soda-lime glass having a thickness within the above-described range, may have a thickness corresponding to 50% or more and 80% or less of the thickness of the existing laminated glass in which two sheets of soda-lime glass having a thickness of about 2.1 mm are laminated, and a weight corresponding to 50% or more and 80% or less of the weight thereof. Accordingly, it is possible to provide laminated glass which is lightweight and thinned as compared to the existing laminated glass.

According to an exemplary embodiment of the present invention, the thin plate glass may be laminated on one surface of the soda-lime glass by interposing a laminating film or a bonding agent.

According to an exemplary embodiment of the present invention, the laminating film may be single-layered or multilayered. When a multi-layered laminating film having two or more layers is used, the compositions of the layers may be different from each other, and the thicknesses of the layers may be the same as or different from each other. As the laminating film, a film for laminating glass in the art may be used without limitation. As an example, the laminating film may include at least one of polyethylene, an ethylene acetic acid vinyl copolymer, polypropylene, polystyrene, a methacrylic resin, polyvinyl chloride, polyethylene terephthalate, polybutylene terephthalate, cellulose acetate, a diallyl phthalate resin, a urea resin, a melamine resin, unsaturated polyester, polyvinylbutyral, polyvinyl formal, polyvinyl alcohol, an acetic acid vinyl resin, an ionomer, polymethylpentene, vinylidene chloride, polysulfone, polyvinylidene fluoride, a methacryl-styrene copolymer resin, polyarylate, polyallyl sulfone, polybutadiene, polyether sulfone, and polyether ether ketone.

Further, as the laminating film, it is possible to use a laminating film which has bonding strength capable of fixing the soda-lime glass and the thin plate glass with desired strength, excellent transmission performance with respect to visible light, and excellent chemical durability.

According to an exemplary embodiment of the present invention, the laminating film may have a thickness of 0.5 mm to 1 mm. By adjusting the thickness of the laminating film to the above-described range, impact absorbability of the laminating film may be suppressed from deteriorating. Further, a laminating film having a thickness within the above-described range may stably fix the thin plate glass and the soda-lime glass, thereby preventing the thin plate glass and the soda-lime glass from being peeled off from the laminating film. In addition, it is possible to prevent stiffness of the laminated glass from deteriorating.

According to an exemplary embodiment of the present invention, examples of the bonding agent may include an optically clear adhesive (OCA), a liquid optically clear adhesive (LOCA), or an optically clear resin (OCR). The bonding agent may be applied to have a thickness of 0.5 mm to 1.5 mm onto one surface of the soda-lime glass or one surface of the thin plate glass.

FIG. 3 is a view illustrating curved laminated glass according to an exemplary embodiment of the present invention. Specifically, FIG. 3 is a view illustrating curved laminated glass in which the curved thin plate glass 200 is laminated on one concave surface of the curved soda-lime glass 100 by the laminating film 300.

According to an exemplary embodiment of the present invention, the thin plate glass and the soda-lime glass may be bent while forming a curved surface in a matched state. One surface of the curved thin plate glass and one surface of the curved soda-lime glass may be precisely and closely attached to and thus matched with each other, thereby forming curved laminated glass. As the curved thin plate glass and the curved soda-lime glass are matched with each other, a lifting between the curved thin plate glass and the curved soda-lime glass in the curved laminated glass may be suppressed, and the transmission performance of the curved laminated glass may be improved. Further, in a state where the curved thin plate glass and the curved soda-lime glass are matched with each other, the curved thin plate glass and the curved soda-lime glass may form edges at the same position. In addition, it is possible to provide curved laminated glass in which curved thin plate glass is laminated on one concave surface or the other convex surface of the curved soda-lime glass.

Referring to FIG. 3, compressive stress may be formed on a surface opposite to a surface of the curved thin plate glass 200 which is adjacent to one concave surface of the curved soda-lime glass 100. As described below, when the thin plate glass 200 is elastically deformed and laminated on one concave surface of the curved soda-lime glass 100, compressive stress may be formed on a surface of the curved thin plate glass 200 which is not adjacent to one concave surface of the curved soda-lime glass 100. Compressive stress may be formed on the surface of the curved thin plate glass, thereby effectively improving impact resistance and fracture strength of the curved laminated glass.

According to an exemplary embodiment of the present invention, the curved laminated glass may have a structure in which both sides of the curved laminated glass are more bent than the center portion thereof. The curved laminated glass having the structure may be applied to a window for an automobile. As an example, the curved laminated glass may be applied to a front window, a side window, a rear window, and a sunroof window among the windows for the automobile. In particular, when the curved laminated glass is applied to a front window among the windows for the automobile, it is possible to effectively reduce the resistance to the traveling wind hit while the automobile is traveling.

According to an exemplary embodiment of the present invention, the thin plate glass and the soda-lime glass may additionally include a coloring component. A heat blocking function may be imparted to laminated glass by adding a coloring component to the thin plate glass and the soda-lime glass. As an example, the coloring component may include at least one of $Fe_2O_3$, CoO, and Se, but the type of coloring component is not limited. Further, the content of the coloring component may be 0.0001 part by weight or more and 2 parts by weight or less, 0.005 part by weight or more and 1 part by weight or less, or 0.01 part by weight or more and 0.1 part by weight or less, based on 100 parts by weight of the glass composition. In addition, it is possible to manufacture laminated glass having visible light transmittance of 70% or more by adjusting the content of the coloring component, and to apply the laminated glass to a front window or side and rear windows among the windows for an automobile. Furthermore, when the laminated glass is applied to a sunroof window among the windows for the automobile, the visible light transmittance of the laminated glass may be formed at about 5%.

Another exemplary embodiment of the present invention provides a method for manufacturing laminated glass, the method including: preparing plate-like soda-lime glass; preparing thin plate glass; and laminating the thin plate glass on one surface of the soda-lime glass, in which fracture toughness of the thin plate glass, which is represented by the following Equation 1, is 1.0 MPa·m$^{1/2}$ or more and 1.3 MPa·m$^{1/2}$ or less.

$$K_{IC} = 0.018 \left(\frac{E}{HV}\right)^{1/2} \left(\frac{P}{C^{3/2}}\right) \qquad \text{[Equation 1]}$$

In Equation 1, $K_{IC}$ is fracture toughness (P·m$^{1/2}$) of the thin plate glass, E is a Young's modulus (Pa) of the thin plate glass, HV is Vickers hardness (Pa) of the thin plate glass, P is an indentation load (N) applied to the thin plate glass, and C is a length (m) of a crack occurring in the thin plate glass due to the indentation load applied to the thin plate glass.

A method for manufacturing laminated glass according to an exemplary embodiment of the present invention may easily provide laminated glass which is excellent in durability and lightweight.

The thin plate glass, the soda-lime glass, the laminating film, and the like in the method for manufacturing laminated glass may be the same as the thin plate glass, the soda-lime glass, the laminating film, and the like included in the above-described laminated glass.

According to an exemplary embodiment of the present invention, the fracture toughness value of the soda-lime glass, which is represented by Equation 1, may be 0.7 MPa·m$^{1/2}$ or more and 0.85 MPa·m$^{1/2}$ or less. Further, the fracture toughness ratio of the soda-lime glass to the thin plate glass, which is calculated through Equation 1, may be 1:1.3 to 1:1.5. Laminated glass which is excellent in impact resistance and lightweight may be easily manufactured by using the soda-lime glass and the thin plate glass, which satisfy the above-described fracture toughness ratio.

According to an exemplary embodiment of the present invention, the thin plate glass may have a Young's modulus of 70 GPa or more and 90 GPa or less, and the thin plate glass may have Vicker's hardness of 5.5 GPa or more and 7 GPa or less. Further, the soda-lime glass may have a Young's modulus of 65 GPa or more and 75 GPa or less, and the soda-lime glass may have Vicker's hardness of 5.0 GPa or more and 5.5 GPa or less. Laminated glass having a robust structure and excellent durability may be manufactured by using the thin plate glass having the Young's modulus and the Vicker's hardness.

In addition, the Young's modulus ratio of the soda-lime glass to the thin plate glass may be 1:1.01 to 1:1.2, and the Vicker's hardness ratio of the soda-lime glass to the thin plate glass may be 1:1.1 to 1:1.3.

According to an exemplary embodiment of the present invention, the laminating of the thin plate glass on one surface of the soda-lime glass comprises laminating the thin plate glass to the soda-lime glass by using a laminating film or a bonding agent. As an example, laminated glass may be manufactured by positioning a laminating film between one surface of the thin plate glass and one surface of the soda-lime glass, and then pressurizing the laminate. In addition, a bonding agent is applied to one surface of the thin plate glass, and one surface of the thin plate glass may be laminated on one surface of the soda-lime glass through the bonding agent.

According to an exemplary embodiment of the present invention, the laminating of the thin plate glass on one surface of the soda-lime glass may be carried out at 80° C. or more and 140° C. or less. By laminating the thin plate glass and the soda-lime glass at a temperature of 80° C. or more and 140° C. or less, it is possible to prevent the bonding strength from being reduced due to the denaturation of the laminating film or the bonding agent, and to reduce manufacturing costs of the laminated glass.

Furthermore, the thin plate glass and the soda-lime glass may be completely laminated by carrying out a process of treating the thin plate glass and the soda-lime glass at high temperature and high pressure in an autoclave.

FIG. 4A is a view illustrating a process of laminating one surface of thin plate glass according to an exemplary embodiment of the present invention on one concave surface of soda-lime glass processed into a curved surface, and FIG. 4B is a view illustrating a process of laminating one surface of thin plate glass according to an exemplary embodiment of the present invention on one convex surface of soda-lime glass processed into a curved surface.

According to an exemplary embodiment of the present invention, the method for manufacturing laminated glass provides curved laminated glass in which curved thin plate glass is laminated on one concave surface of curved soda-lime glass or curved laminated glass in which curved thin plate glass is laminated on the other convex surface of curved soda-lime glass.

According to an exemplary embodiment of the present invention, the method for manufacturing laminated glass further includes processing the soda-lime glass into a curved surface, and the laminating of the thin plate glass on one surface of the soda-lime glass may include laminating the thin plate glass on one concave surface of the soda-lime glass processed into a curved surface.

According to an exemplary embodiment of the present invention, the soda-lime glass may be processed into a curved surface by using a typical method in the art. As an example, curved soda-lime glass may be manufactured by using a self-weight molding method of exposing plate-like soda-lime glass to a high temperature in a state where the plate-like soda-lime glass is placed onto a molding frame, or a press molding method of inserting the plate-like soda-lime glass between upper and lower molds, and then applying pressure thereon at high temperature. Specifically, the plate-like soda-lime glass may be processed into a curved surface by using the self-weight molding method at a temperature of 500° C. or more and 700° C. or less.

According to an exemplary embodiment of the present invention, the soda-lime glass may be processed into a curved surface by using support glass in order to prevent occurrence of a bulging phenomenon in which the curvature at the center portion of the soda-lime glass is larger than a target curvature. The support glass may have a higher softening point and a higher viscosity than the soda-lime glass. As an example, the soda line glass may be processed into a curved surface by positioning the support glass at a position adjacent to the ground or a molding frame, laminating the plate-like soda-lime glass on an upper surface of the support glass, and then heating the soda-lime glass near the softening point of the soda-lime glass.

Since the support glass has a higher softening point than the softening point of the soda-lime glass, the support glass does not completely melt in the process of processing the soda-lime glass into a curved surface, is slightly deformed by the self-weight thereof, and maintains the strength thereof at a certain level or more. Accordingly, the support glass may effectively support the soda-lime glass to suppress the bulging phenomenon which may occur during the process of processing the soda-lime glass into a curved surface. In contrast, as the temperature of the soda-lime glass reaches near the softening point of the soda-lime glass, the soda-lime glass melts, and is processed into a curved surface by the self-weight thereof while it is supported by the support glass.

According to an exemplary embodiment of the present invention, the laminating of the thin plate glass on one surface of the soda-lime glass may include providing the thin plate glass on the soda-lime glass processed into a curved surface, and then elastically deforming the thin plate glass to be matched with the soda-lime glass processed into a curved surface. Specifically, the curved thin plate glass may be matched with one concave surface of the curved soda-lime glass by providing the thin plate glass on one concave surface of the soda-lime glass processed into a curved surface, and then elastically deforming the thin plate glass. As the curved thin plate glass and the curved soda-lime glass are matched with each other, a lifting between the curved thin plate glass and the curved soda-lime glass in the curved laminated glass may be suppressed, and the transmission performance of the curved laminated glass may be improved. Further, since the thin plate glass is elastically deformed into a curved surface during the lamination process, there is an advantage in that the manufacturing process is simplified. Accordingly, according to an exemplary embodiment of the present invention, the processing costs and the processing time of the curved laminated glass may be reduced.

According to an exemplary embodiment of the present invention, a method of elastically deforming the thin plate glass is not particularly limited as long as the method is typically used in the art. As an example, the thin plate glass may be elastically deformed at a room temperature of 20° C. or more and 35° C. or less through a compression process using a high temperature roller or vacuum ring/vacuum bag process.

Referring to FIG. 4A, as the thin plate glass 200 is elastically deformed on one concave surface of the curved soda-lime glass 100, compressive stress may be formed on a surface opposite to the surface of the curved thin plate glass 200 adjacent to one concave surface of the curved soda-lime glass 100. That is, compressive stress may be formed on a surface of the curved thin plate glass 200 which is not in contact with one concave surface of the curved soda-lime glass 100, thereby effectively improving the impact resistance and durability of the curved laminated glass.

According to an exemplary embodiment of the present invention, the method for manufacturing laminated glass further includes processing the thin plate glass into a curved surface, and the laminating of the thin plate glass on one surface of the soda-lime glass may include laminating the thin plate glass processed into a curved surface on one concave surface of the soda-lime glass processed into a curved surface.

According to an exemplary embodiment of the present invention, the thin plate glass may be processed into a curved surface by using a typical method in the art. As an example, curved thin plate glass may be manufactured by using a self-weight molding method of exposing plate-like thin plate glass to a high temperature in a state where the plate-like thin plate glass is placed onto a molding frame, or a press molding method of inserting the plate-like soda-lime thin plate glass between upper and lower molds, and then applying pressure thereon at high temperature. Specifically, the thin plate glass may be processed into a curved surface by using a self-weight molding method at a temperature of 500° C. or more and 700° C. or less.

According to an exemplary embodiment of the present invention, the thin plate glass laminated thin plate glass on one surface of the soda-lime glass may have the same radius of curvature as that of the soda-lime glass processed into a curved surface. That is, the radii of curvature of the soda-lime glass processed into a curved surface and the curved thin plate glass laminated on the soda-lime glass may be substantially the same as each other. The fact that the radii of the curved soda-lime glass and the curved thin plate glass are substantially the same as each other may mean that a slight difference in the radius of curvature between the curved soda-lime glass and the curved thin plate glass does not affect the quality, the optical properties, and the like of the curved laminated glass even when the curved soda-lime glass and the curved thin plate glass do not have the same radius of curvature.

The curved soda-lime glass and the curved thin plate glass have the same radius of curvature and thus may be more precisely matched with each other. Accordingly, there are advantages in that the transmission performance of the curved laminated glass may be improved, and a user may more clearly secure the visual field when the curved laminated glass is used for a front window for an automobile.

According to an exemplary embodiment of the present invention, the curved soda-lime glass and the curved thin plate glass may have a radius of curvature of 3,000 R or more and 10,000 R or less, specifically, 4,000 R or more and 8,000 R or less, or 5,000 R or more and 7,000 R or less. However, the above-described radii of curvature of the curved soda-lime glass and the curved thin plate glass may be formed to be different from each other according to the use of the applied window.

According to an exemplary embodiment of the present invention, the laminating of the thin plate glass on one surface of the soda-lime glass may include laminating the thin plate glass on one concave surface of the soda-lime glass processed into a curved surface. Referring to FIG. 4A, since the thin plate glass 200 is laminated on one concave surface of the curved soda-lime glass 100, it may be preferred that the thin plate glass 200 has a smaller dimension than that of the soda-lime glass 100 before the soda-lime glass 100 is processed into a curved surface. In addition, it may be preferred that the thin plate glass and the soda-lime glass processed into a curved surface are laminated so as to form an edge together at the same position and thus be matched with each other.

Referring to FIG. 4B, curved laminated glass may be manufactured by laminating the thin plate glass 200 on the other convex surface of the curved soda-lime glass 100. For example, when the curved laminated glass is applied to a window for an automobile, the window for the automobile may secure high scratch resistance and high glass surface hardness as the curved thin plate glass is positioned at an outer side of the window for the automobile. Accordingly, it is possible to effectively reduce damage to impacts caused by external foreign matters such as sand which is flying from the outside of a vehicle. Further, the curved thin plate glass has higher fracture toughness than that of the curved soda-lime glass and thus may provide a window for an automobile, which has excellent facture resistance due to external impact.

Further, since the thin plate glass is laminated on the other convex surface of the soda-lime glass, it may be preferred that the thin plate glass has a larger dimension than that of the soda-lime glass before the soda-lime glass is processed into a curved surface. In addition, it may be preferred that the thin plate glass and the soda-lime glass 100 processed into a curved surface are laminated so as to form an edge together at the same position and thus be matched with each other.

EXPLANATION OF REFERENCE NUMERALS AND SYMBOLS

100: Soda-lime glass
200: Thin plate glass
300: Laminating film

MODE FOR INVENTION

Hereinafter, the present invention will be described in more detail through Examples. These Examples are provided for only describing the present invention, and are not intended to limit the present invention.

Manufacture of Laminated Glass

Example 1

Alkali-free glass having a thickness of 0.5 mm was prepared as thin plate glass, and soda-lime glass having a thickness of 2.1 mm was prepared as soda-lime glass. Further, a polyvinyl butyral (PVB) film having a thickness of 0.76 mm was prepared as a laminating film.

The Young's modulus of the alkali-free glass, which were measured by the above-described 3 point bending test, were 77 GPa to 86 GPa, with average of 84.7 GPa and standard deviation of 3.3 GPa, and the Young's modulus of the soda-lime glass, which were measured by the above-described 3 point bending test, were 60 GPa to 72 GPa, with average of 60.6 GPa and standard deviation of 2.6 GPa. The Vicker's hardness of the alkali-free glass, which were measured by the above-described Vicker's hardness measurement test, were 6.1 GPa to 6.5 GPa, with average of 6.4 GPa and standard deviation of 0.1 GPa, and the Vicker's hardness of the soda-lime glass, which were measured by the above-described Vicker's hardness measurement test, were 5.3 GPa to 5.7 GPa, with average of 5.5 GPa and standard deviation of 0.1 GPa, respectively. Further, when an indentation load of 19.6 N (2 Kgf) was applied to each of the alkali-free glass and the soda-lime glass by using the above-described indentation fracture toughness measurement method, a crack having a length of $94 \times 10^{-6}$ m to $111 \times 10^{-6}$ m, with average of $104 \times 10^{-6}$ m and standard deviation of $5 \times 10^{-6}$ m occurred in the alkali-free glass, and a crack having a length of $126 \times 10^{-6}$ m to $147 \times 10^{-6}$ m, with average of $138 \times 10^{-6}$ m and standard deviation of $8 \times 10^{-6}$ m occurred in the soda-lime glass. The fracture toughness of the alkali-free glass, which were calculated through the measured data and Equation 1, were 1.19 MPa·m$^{1/2}$ to 1.22 MPa·m$^{1/2}$, with average of 1.21 MPa·m$^{1/2}$, and standard deviation of 0.03 MPa·m$^{1/2}$, and the fracture toughness of the soda-lime glass, which were calculated through the measured data and Equation 1, were 0.67 MPa·m$^{1/2}$ to 0.77 MPa·m$^{1/2}$, with average of 0.72 MPa·m$^{1/2}$ and standard deviation of 0.05 MPa·m$^{1/2}$.

First, a laminating film was placed between the soda-lime glass and the alkali-free glass, and the resulting laminate was compressed under conditions of a temperature of about 80° C. and a pressure of about 300 torr. Laminated glass was manufactured by treating the compressed alkali-free glass and soda-lime glass in an autoclave under conditions of a temperature of about 130° C. and a pressure of about 8,820 torr.

Examples 2 and 3

Laminated glass was manufactured in the same manner as in Example 1, except that alkali-free glass having the same Young's modulus, Vicker's hardness, and fracture toughness as those in Example 1 and a thickness of 0.7 mm was prepared in Example 2, and alkali-free glass having the same Young's modulus, Vicker's hardness, and fracture toughness as those in Example 1 and a thickness of 0.4 mm was prepared in Example 3.

Comparative Example 1

Two sheets of the same soda-lime glass as that in Example 1 and a PVB film having a thickness of 0.34 mm as a laminating film were prepared. The laminating film was placed between the two sheets of the soda-lime glass, and the resulting laminate was compressed under conditions of a temperature of about 80° C. and a pressure of about 300 torr. Laminated glass was manufactured by treating the compressed soda-lime glass in an autoclave under conditions of a temperature of about 130° C. and a pressure of about 8,820 torr.

Manufacture of Curved Laminated Glass

Example 4

Alkali-free glass having the same Young's modulus, Vicker's hardness, and fracture toughness as those in Example 1 and a thickness of 0.4 mm was prepared, and the soda-lime glass and the laminating film, which were the same as those in Example 1, were prepared.

First, the soda-lime glass was heated at 600° C. for seconds and processed into a curved surface by self-weight. Thereafter, the laminating film was attached onto the alkali-free glass and positioned so as to be adjacent to a concave surface of the soda-lime glass processed into a curved surface. Thereafter, the soda-lime glass, the alkali-free glass, and the laminating film were put into a vacuum bag and sealed, and then the soda-lime glass and the alkali-free glass were laminated by compressing the soda-lime glass, the alkali-free glass, and the laminating film with a vacuum ring under conditions of a temperature of about 20° C. and a pressure of 150 torr. Curved laminated glass was manufactured by treating the laminated alkali-free glass and soda-lime glass in an autoclave under conditions of a temperature of about 130° C. and a pressure of 9,750 torr.

Examples 5 and 6

Curved laminated glass was manufactured in the same manner as in Example 4, except that alkali-free glass having the same Young's modulus, Vicker's hardness, and fracture toughness as those in Example 1 and a thickness of 0.5 mm was prepared in Example 5, and alkali-free glass having the same Young's modulus, Vicker's hardness, and fracture toughness as those in Example 1 and a thickness of 0.7 mm was prepared in Example 6.

Comparative Example 2

After two sheets of the soda-lime glass and a laminating film, which were the same as those in Comparative Example 1, were prepared, the two sheets of the soda-lime glass were overlapped with each other, and then processed into a curved surface by self-weight while being heated at 600° C. for 60 seconds. Thereafter, the laminating film was provided between the two sheets of the soda-lime glass processed into a curved surface, and curved laminated glass was manufactured by treating the two sheets of the soda-lime glass in an autoclave under conditions of a temperature of about 130° C. and a pressure of 9,750 torr.

Falling Ball Impact Test

Samples of the laminated glass manufactured in Examples 1 to 3 and Comparative Example 1 were prepared. A falling ball impact test was performed by a method of applying impact to the sample by disposing the prepared sample, such that the soda-lime glass was positioned at the upper side based on the ground, and dropping a ball having a weight of 227 g from a height of 2.8 m from the sample. Thereafter, tensile stress occurring in the alkali-free glass in Examples 1 to 3 and tensile stress occurring in the soda-lime glass positioned at the lower side in Comparative Example 1 were measured by using a strain gauge (Magnet sensor LI50 with magnetic tape, Kuebler Group).

As a result of the measurement, the tensile stress of the alkali-free glass measured in Example 1 was higher by about 128% than that of the soda-lime glass measured in Comparative Example 1, and the tensile stresses of the alkali-free glass measured in Examples 2 and 3 were higher by about 135% than that of the soda-lime glass measured in Comparative Example 1.

It can be seen that the fracture toughness values of the alkali-free glass used in the laminated glass according to Examples 1 to 3 of the present invention, which are calculated through Equation 1, is higher by about 135% to 150% than the fracture toughness value of the soda-lime glass used in the laminated glass according to Comparative Example 1, that is, the laminated glass manufactured in Examples 1 to 3 is less likely to be fractured even when a slightly increased tensile stress occurs in the alkali-free glass of the laminated glass manufactured in Examples 1 to 3, as compared to the laminated glass manufactured in Comparative Example 1.

Furthermore, samples of the curved laminated glass manufactured in Examples 4 to 6 and Comparative Example 2 were prepared, a falling ball impact test was performed by a method which is the same as the above-described method, and the tensile stress occurring in the glass positioned at the lower side was measured by using a strain gauge.

As a result of the measurement, the tensile stresses of the alkali-free glass measured in Examples 4 and 6 were higher by about 135% than that of the soda-lime glass measured in Comparative Example 2, and the tensile stress of the alkali-free glass measured in Example 5 was higher by about 129% than that of the soda-lime glass measured in Comparative Example 2.

As described above, it can be seen that the laminated glass manufactured in Examples 4 to 6 is less likely to be fractured because the fracture toughness values of the alkali-free glass used in the curved laminated glass according to Examples 4 to 6 of the present invention, which are calculated through Equation 1, is higher by about 135% to 150% than the fracture toughness value of the soda-lime glass used in the curved laminated glass according to Comparative Example 2.

Therefore, it can be seen that the laminated glass including the thin plate glass of which the fracture toughness represented by Equation 1 is 1.0 MPa·m$^{1/2}$ or more and 1.3 MPa·m$^{1/2}$ or less has excellent impact resistance and may effectively become lightweight.

The invention claimed is:

1. A bent laminated glass for automobile comprising:
 a bent soda-lime glass; and
 a bent thin plate glass laminated on one concave surface of the bent soda-lime glass,
 wherein the bent thin plate glass is a non-tempered alkali-free glass including 26 wt % to 29 wt % of Al$_2$O$_3$,
 wherein a thickness ratio of the bent soda-lime glass to the bent thin plate glass is 1:0.1 to 1:0.5,
 wherein a first surface of the bent thin plate glass is adjacent to the bent soda-lime glass, and compressive bending stress is formed on a second surface of the bent thin plate glass, and
 wherein a fracture toughness of the bent thin plate glass, which is represented by the following Equation 1, is 1.0 MPa·m$^{1/2}$ or more and 1.3 MPa·m$^{1/2}$ or less:

$$K_{IC} = 0.018\left(\frac{E}{HV}\right)^{1/2}\left(\frac{P}{C^{3/2}}\right) \quad \text{[Equation 1]}$$

in Equation 1, $K_{IC}$ is the fracture toughness (Pa·m$^{1/2}$) of the bent thin plate glass, E is Young's modulus (Pa) of the bent thin plate glass, HV is Vicker's hardness (Pa) of the bent thin plate glass, P is an indentation load (N) applied to the bent thin plate glass, and C is a length (m) of a crack occurring in the bent thin plate glass due to the indentation load applied to the bent thin plate glass.

2. The bent laminated glass for automobile of claim 1, wherein the bent thin plate glass has Young's modulus of 70 GPa or more and 90 GPa or less and Vicker's hardness of 5.5 GPa or more and 7 GPa or less.

3. The bent laminated glass for automobile of claim 1, wherein the bent thin plate glass has a thickness of 0.3 mm or more and 1.0 mm or less.

4. The bent laminated glass for automobile of claim 1, wherein the bent thin plate glass is laminated on one surface of the bent soda-lime glass by interposing a laminating film or a bonding agent.

5. The bent laminated glass for automobile of claim 1, wherein the bent thin plate glass and the bent soda-lime glass are bent while forming a curved surface in a state of being matched with each other.

6. The laminated glass for automobile of claim 1, wherein a fracture toughness ratio of the bent soda-lime glass to the bent thin plate glass is 1:1.3 to 1:1.5.

7. A method for manufacturing a laminated glass for automobile, the method comprising:
 preparing a soda-lime glass which is a flat plate;
 processing the soda-lime glass into a curved surface;
 preparing a thin plate glass; and
 laminating the thin plate glass on one surface of the soda-lime glass, the step of which comprises providing the thin plate glass on the soda-lime glass processed into a curved surface, then elastically deforming the thin plate glass to match with the soda-lime glass processed into a curved surface, and laminating the thin plate glass on one concave surface of the soda-lime glass processed into a curved surface,
 wherein the thin plate glass is a non-tempered alkali-free glass including 26 wt % to 29 wt % of Al$_2$O$_3$,
 wherein a thickness ratio of the soda-lime glass to the thin plate glass is 1:0.1 to 1:0.5,
 wherein a fracture toughness of the thin plate glass, which is represented by the following Equation 1, is 1.0 MPa·m$^{1/2}$ or more and 1.3 MPa·m$^{1/2}$ or less:

$$K_{IC} = 0.018\left(\frac{E}{HV}\right)^{1/2}\left(\frac{P}{C^{3/2}}\right) \quad \text{[Equation 1]}$$

in Equation 1, $K_{IC}$ is the fracture toughness (Pa·m$^{1/2}$) of the thin plate glass, E is Young's modulus (Pa) of the thin plate glass, HV is Vicker's hardness (Pa) of the thin plate glass, P is an indentation load (N) applied to the thin plate glass, and C is a length (m) of a crack occurring in the thin plate glass due to the indentation load applied to the thin plate glass.

8. The method of claim 7, wherein the thin plate glass has Young's modulus of 70 GPa or more and 90 GPa or less and Vicker's hardness of 5.5 GPa or more and 7 GPa or less.

9. The method of claim 7, wherein the step of laminating the thin plate glass on one surface of the soda-lime glass comprises laminating the thin plate glass on the soda-lime glass by using a laminating film or a bonding agent.

10. The method of claim 7, wherein the step of laminating the thin plate glass on one surface of the soda-lime glass is carried out at 80° C. or more and 140° C. or less.

11. The method of claim 7, wherein the curvature of the thin plate glass laminated on the soda-lime glass conforms to the curvature of the soda-lime glass processed into a curved surface.

12. The method of claim 7, wherein a fracture toughness ratio of the soda-lime glass to the thin plate glass is 1:1.3 to 1:1.5.

\* \* \* \* \*